United States Patent
Sharma et al.

(10) Patent No.: US 10,034,263 B2
(45) Date of Patent: Jul. 24, 2018

(54) DETERMINING SCALE FOR RECEIVED SIGNAL STRENGTH INDICATORS AND COORDINATE INFORMATION

(71) Applicant: Hewlett Packard Enterprise Development LP, Houston, TX (US)

(72) Inventors: Manas Sharma, Bangalore Karnataka (IN); Gopal Agarwal, Bangalore Karnataka (IN); Manaswini Lakshmikanth Sugatoor, Bangalore Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/458,169

(22) Filed: Mar. 14, 2017

(65) Prior Publication Data
US 2018/0007652 A1 Jan. 4, 2018

(30) Foreign Application Priority Data
Jun. 30, 2016 (IN) .............................. 201641022610

(51) Int. Cl.
*H04W 64/00* (2009.01)
*H04B 17/318* (2015.01)
*H04W 4/02* (2018.01)

(52) U.S. Cl.
CPC .......... *H04W 64/00* (2013.01); *H04B 17/318* (2015.01); *H04W 4/02* (2013.01)

(58) Field of Classification Search
CPC ....... H04W 84/12; H04W 4/02; H04W 64/00; H04W 4/023; H04W 64/003; H04W 4/029; H04W 64/006; H04W 4/043; H04B 17/318
See application file for complete search history.

(56) References Cited

U.S. PATENT DOCUMENTS

| | | | |
|---|---|---|---|
| 7,493,127 B2 | 2/2009 | Morgan et al. | |
| 8,478,297 B2 | 7/2013 | Morgan et al. | |
| 8,626,548 B2 | 1/2014 | Patel | |
| 2008/0318591 A1 | 12/2008 | Oliver | |
| 2009/0291694 A1* | 11/2009 | Yano | G01S 5/0294 455/456.5 |
| 2014/0226503 A1* | 8/2014 | Cooper | H04W 4/043 370/252 |

(Continued)

OTHER PUBLICATIONS

Differential Access Points for Indoor Location Estimation by Chang et al., dated Aug. 2010.*

(Continued)

*Primary Examiner* — Daniel Lai
(74) *Attorney, Agent, or Firm* — Hewlett Packard Enterprise Patent Department

(57) ABSTRACT

Examples disclosed herein relate to determining a scale associated with received signal strength indicators (RSSIs). In one example, a computing device receives access point (AP) RSSIs. The RSSIs are determined at APs. The APs are associated with coordinate information. In one example, records are maintained for AP reference pairs. Each AP RSSI can be determined at one AP with reference to another AP. In one example, the computing device determines a scale associated with each record.

15 Claims, 5 Drawing Sheets

(56) References Cited

U.S. PATENT DOCUMENTS

2015/0327018 A1   11/2015   Rehnberg et al.

OTHER PUBLICATIONS

Akeila et al., "Bluetooth-based Indoor Positioning with Fuzzy Based Dynamic Calibration", XP031848037, TenCon 2010—2010 IEEE Region 10, Conference, NJ, USA, Nov. 21, 2010, pp. 1415-1420.
Dominguez-Duran et al., "Dynamic calibration and zero configuration positioning system for WSN", XP031316344, Electrotechnical Conference 2008, Melecon 2008, The 14th IEEE Mediterranean, IEEE, Piscataway, NJ, USA, May 5, 208, pp. 145-150.
Fernandez et al., "Bluetooth Sensor Network Positioning System with Dynamic Calibration", XP031166728, Wireless Communication Systems, 2007. ISWCS 2007, 4th International Symposium, Oct. 1, 2007, pp. 45-49.
Gwon et al, "Error Characteristics and Calibration-tree Techniques for Wireless LAN-based Locatian Estimation", XP058347742, Proceedings of the Second International Workshop on Mobility Management & Wireiess Access Protocols, Pennsylvania, US, Oct. 1, 2004, pp. 2-9.

* cited by examiner

DETERMINING SCALE FOR RECEIVED SIGNAL STRENGTH INDICATORS AND COORDINATE INFORMATION

BACKGROUND

Computer networks can be used to allow networked devices, such as personal computers, mobile devices, servers, etc., to exchange data. Access Points can be used to connect networked devices to a network. Further, Access Points can be used for Wi-Fi positioning systems.

BRIEF DESCRIPTION OF THE DRAWINGS

The following detailed description references the drawings, wherein.

DETAILED DESCRIPTION

Figure 1:
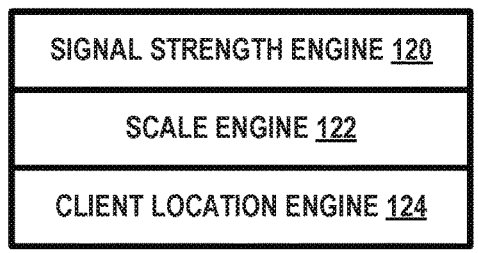
FIGS. 1 and 2 are block diagrams of a system capable of determining coordinate locations of client devices using received signal strength indicators (RSSIs), according to various examples.
Figure 1:
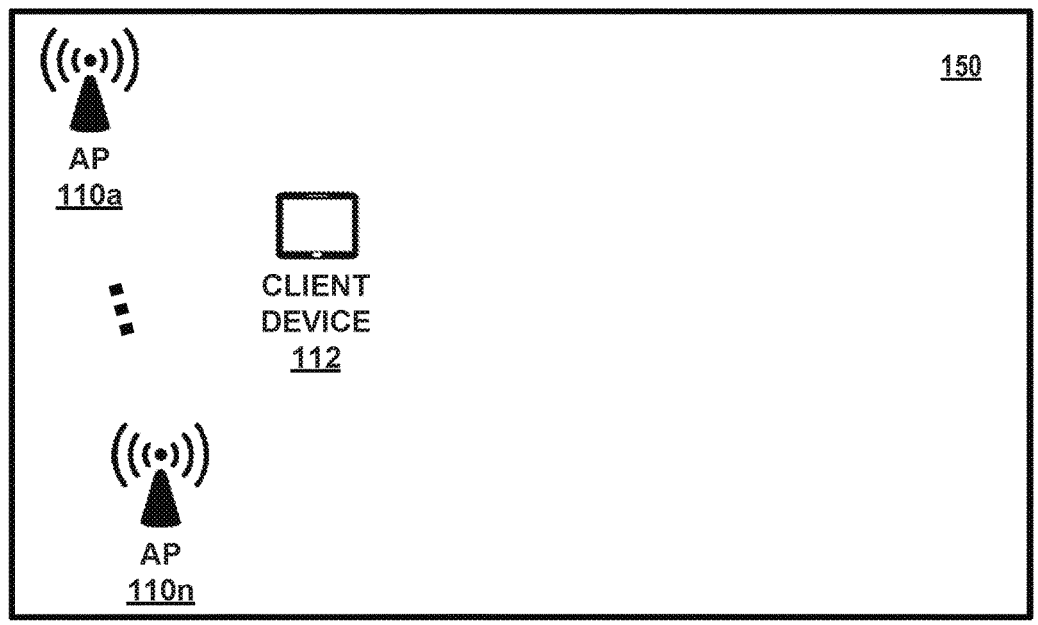

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

It can be beneficial to know the location of an access point (AP), also known as a wireless access point, as well as the location of client devices including mobile devices such as cell phones, laptops, tablets, etc. as well as stationary devices such as the access points and other computing devices. One approach to determining a location is using a global positioning system (GPS). However, access to satellites may be blocked (e.g., because the location is within a building) or a device may not have that capability. Further, GPS usage would be implemented and known by a client device and not an entity owning or controlling the property, such as interested parties in a shopping mall, a university campus, an enterprise business, an office building, a sporting or event complex, a hotel or other business, etc. Such an entity would not know of the client device's position information unless the client shared the information. In the absence of a floor plan for a venue or location, it can be challenging for an entity to determine the location of a client device.

Accordingly, various examples disclosed herein relate to determining a location of a client device using APs. Each AP can be provisioned or dynamically determine its coordinates (e.g., Latitude, Longitude, and/or Altitude). The coordinates can be relative to a reference point (e.g., one of the APs) or use broader coordinates, such as a longitude, latitude, and/or altitude. In some examples, the APs can communicate and/or publish the location information, for example, using 802.11 Vendor Specific Information Elements. This way, the locations of each of the APs are known and can be used to determine the location of client devices.

Further, received signal strength indicators (RSSIs) can be collected between APs. Since the locations of the APs are known, a distance between the two APs can be determined and correlated with the signal strength from the RSSIs. This can be used to determine a scale between RSSIs and APs. When a client device contacts an AP, the AP can determines the RSSI of the client device. This and the scale can be used to determine an approximate distance from the AP. Distances from multiple APs can be used to determine the location of the client device. For example, triangulation, trilateration, or other similar technique can be used to determine the location of a client device. Other information, for example, floorplan boundaries, can be used to supplement the RSSI information and coordinate information of APs to determine coordinate information about client devices.

As used herein, "RSSI" is a measurement of the power present in a received radio signal. In some examples, RSSI is an indication of the power level being received by the radio after antenna and possible cable loss. In some examples, when a device has contact with the radio of an AP, the RSSI can be determined for the AP referring to the device.

Figure 2:
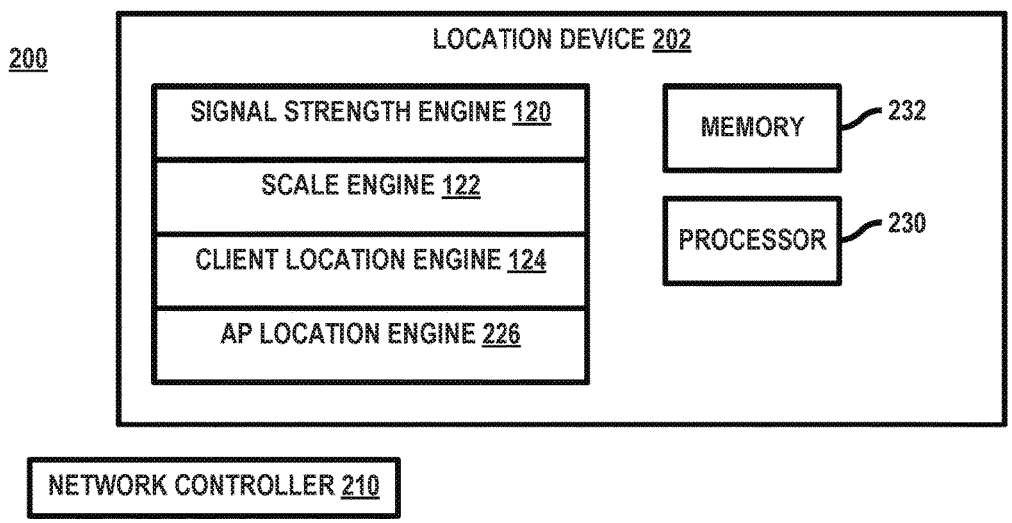
Figure 2:
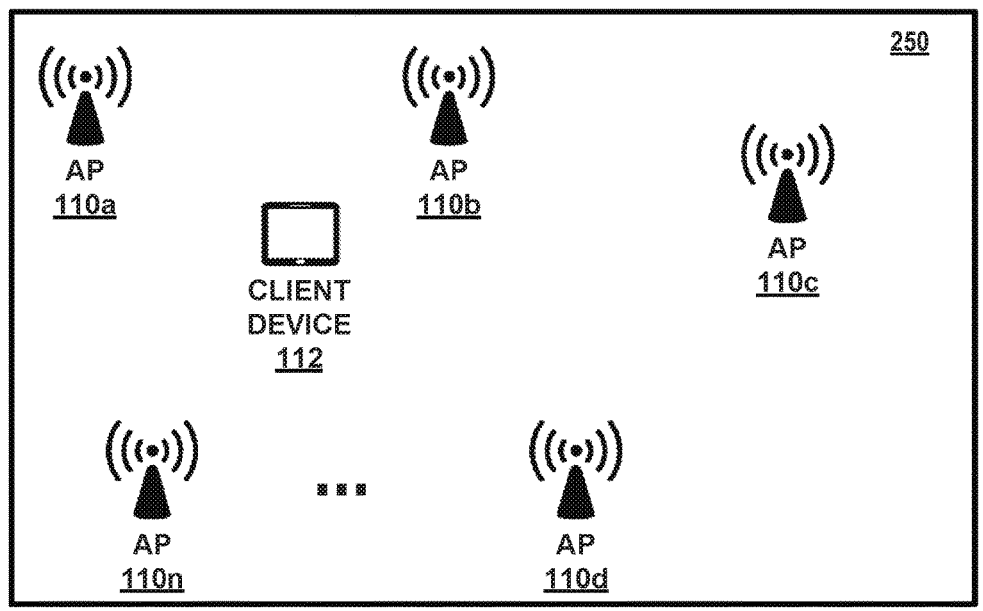

FIGS. 1 and 2 are block diagrams of a system capable of determining coordinate locations of client devices using received signal strength indicators (RSSIs), according to various examples. In the example of FIG. 1, system 100 includes an example of using APs 110*a*-110*n* to determine location information about a client device 112. In one example, the system 100 can also include a signal strength engine 120, a scale engine 122, and a client location engine 124.

In the example of FIG. 2, system 200 can further include a location device 202 that includes the signal strength engine 120, the scale engine 122, and client location engine 124. The location device 202 can further include an access point location engine 226, a processor 230 and memory 232. Moreover, the system 200 can further include a network controller 210. Further, system 200 further shows additional APs 110*b*, 110*c*, 110*d* that can be included in an implementation.

The engines 120, 122, 124 can be used to maintain records to determine locations of client devices such as client device 112. Though other client devices are not shown in FIG. 1 or 2, it is contemplated that the location of other client devices can be determined using the approaches described herein. The engines 120, 122, 124, 226 can be part of a single location device 202, be implemented on multiple computing devices, etc. Similarly, network controller 210 can be implemented with the location device 202, be a separate computing device, and/or be implemented using multiple computing devices. Further, the devices and engines can be implemented remotely and/or at the same location as the APs 110 and client device 112. For example, the location device 202 and/or network controller 210 can be connected to a data or control network capable of communicating with the APs.

The AP location engine 226 can keep a record of the location of each of the APs 110. In some examples, the AP location engine 226 can be provided the location information (e.g., by an administrator associated with the system 200). In some examples, the APs 110 can know their respective locations. For example, a technician can set the respective AP's location when installing the AP 110. In other examples, the AP 110 may include an internal or external position device or sensor such as GPS to determine its location. Further, the APs 110 may provide their respective locations to the AP location engine 226. Since APs 110 are usually tied to a power source, the location of the APs 110 can be relatively static. However, it is contemplated that the APs 110 can be mobile and change locations.

Moreover, the APs 110 may also publish the location using a communication approach such as a communication protocol. For example, the location can be published using an 802.11 Vendor Specific Information Element. In one example, the information element may include a field for type (indicating the Vendor Specific Information Element), a length of the frame, a latitude, a longitude, and an altitude. The information may be broadcasted at a beacon interval with each beacon frame. In another example, the information can be unicasted as part of a probe response to a client device 112, another AP 110, or other device such as the location device 202 or network controller 210.

In one example, the AP location engine 226 can maintain a map data structure to identify placements of APs in a customer deployment. Due to the information received about APs, specifics about locations (e.g., coordinates such as Latitude, Longitude, and Altitude), generated maps can be accurate and to scale. In some examples, geographic coordinate system coordinates, global positioning coordinates, reference coordinates, etc. can be used. In other examples, other coordinate systems can be used. For example, in the coordinate system, a number of dimensions (e.g., an x-axis, a y-axis, and/or a z-axis) can be used. Each dimension can be associated with a coordinate. In one example, each AP on a floor can be placed on a 2-dimensional polygon based on x and y coordinate. In some examples, a z coordinate representing the altitude can also be used. In one example, one of the APs 110 (e.g., AP 110a) can be used as a reference point and coordinates can revolve around AP 110a. As noted, in other examples, the coordinates can be based on a global system or another reference. Maps 150, 250 show example locations of the APs 110a-110n and client device 112. In the example maps 150, 250, a boundary is shown around a two dimensional polygon for illustrative purposes. Known boundaries can be used in determining locations of the APs 110 and client devices 112.

Each AP 110 can be located so that it is able to hear at least one other AP 110. The APs 110 can each send information received from hearing other APs 110 to the signal strength engine 120. As used herein, AP RSSIs are RSSIs determined at one of the APs (e.g., AP 110a) that refers to another AP (e.g., one of AP 110b-110n). An AP 110 may send out beacon messages that the other APs 110 can hear. As used herein, an AP can hear another AP if the AP's radio is able to receive a communication from the other AP. The AP RSSIs can be based on these messages. In some examples, the AP RSSIs can be sent to the signal strength engine 120 by the APs 110 in messages. In one example, the AP 110 can collect a group of the AP RSSIs associated with other APs and send the group of the AP RSSIs to the signal strength engine. The group may be sent based on a trigger (e.g., sent periodically, once a threshold number of AP RSSIs are collected, etc.). Moreover, in some examples, RSSIs for messages received from other devices (e.g., client device 112) can be sent with a group of AP RSSIs or on their own. In some examples, the RSSI information can include an identifier of the AP that receives the signal, an identifier of the AP (or other device) that sent the signal, and/or a timestamp.

The signal strength engine 120 can receive the AP RSSIs from the APs 110a-110n. A scale engine 122 can process the coordinate information for each of the APs 110 and take into account the AP RSSIs to determine coordinate scale values. As used herein, a coordinate scale value is a parameter that can be used to determine a distance of a radio from an AP based on RSSI.

As used herein, an access point reference pair is a set of two APs where one of the APs references the second AP. In one example, AP 110a is able to hear AP 110b. Similarly, AP 110b may be able to hear AP 110a. A record can be created for the RSSI information associated with each AP. Table 1 shows such an example:

TABLE 1

Reference Pair Example

| AP Pair | RSSI Information | x Coordinate | y Coordinate |
|---|---|---|---|
| AP 110a-110b | RSSI 110a-110b | AP 110a-110b(x) | AP 110a-110b(y) |
| AP 110b-110a | RSSI 110b-110a | AP 110b-110a(x) | AP 110b-110a(y) |
| . . . | | | |
| AP 110a-110n | RSSI 110a-110n | AP 110a-110n(x) | AP 110a-110n(y) |

Table 1 shows various AP reference pairs. A reference pair can be created for each AP referencing another AP that it can hear. The reference pair can include information that can be used to scale, such as an x and y coordinate in a coordinate system, a difference between the coordinates, etc. Additionally, RSSI information can be collected and maintained. In some examples, the RSSI information can be maintained, for example, the last RSSI value received can be kept, a normalized RSSI value can be determined (e.g., based on a normalizing function or process), a set of previous RSSI values, etc. As shown in Table 1, a reference pair can exist for AP 110a-110b where AP 110a determines RSSIs for and refers to AP 110b and a separate reference pair where AP 110b determines RSSIs for and refers to AP 110a. Similarly, AP reference pairs can exist for each of the APs and/or for each of the APs that have heard another AP.

Table 2 shows another example of using scale values for AP reference pairs.

TABLE 2

Scaling Example

| AP Pair | RSSI Scale | Distance |
|---|---|---|
| AP 110a-110b | Scale Value 1 | AP 110a-110b(x, y) |
| AP 110b-110a | Scale Value 2 | AP 110b-110a(x, y) |
| . . . | | |
| AP 110a-110n | Scale Value i | AP 110a-110n(x, y) |

In this example coordinate scale values can be determined. In some examples, the coordinate scale values are the RSSI information. In other examples, the coordinate scale values are processed RSSI information (e.g., taking into account multiple samples of RSSI information). In one example, the coordinate scale values can be used to create a fit model for the way radio signal strength in the area correlate to distances. Examples of fit models are a general linear fit model, a heteroscedastic model, a trend line, polynomial regression, etc. In some examples, a base model can be set and parameters can be set to account for interference. In some examples, the model can be used to scale RSSI values to distances. Moreover, the scale values can be considered a scale. Further, in some examples, the fit model can also take into account the characteristics of radio signal strength at particular channels being used. Moreover, the model can normalize the model(s) based on which APs can hear a client device 112. Normalization can be beneficial since each client device 112 may have varying radio/antenna strengths. For example, comparisons of how much signal is heard at each AP compared to other APs can be used in the normalization process. As such, in some examples, the distance values can be based on an RSSI for the client device 112 seen at a first AP compared to an RSSI for the client device 112 seen at a second AP at the same or similar time. In one example, 2 client devices in the same location as client device 112 can be seen by multiple APs, for example, AP 110a, AP 110b, and AP 110n. The transmission capabilities of each can be different (e.g., one is more powerful than the other). Accordingly, distance values can be represented in an abstract manner, for example, as a ratio of power seen between reference pairs.

The client location engine 124 can be used to determine a coordinate location of a client device 112 based on client RSSIs and coordinate scale values. In one example, the signal strength engine 120 can receive client RSSIs from APs 110. Client RSSIs are RSSIs observed at respective APs 110a-110n that observe a client device, for example, client device 112. An AP can determine an RSSI whenever a client device makes contact, for example, when the client device looks for an AP to connect to, when the client device sends a message, etc. The AP can record, for example, an identifier (e.g., a media access control (MAC) address, a device identifier, etc.) of a client device 112, a client RSSI for the client device 112, and a timestamp. In other examples, other information may additionally be collected. Multiple APs 110 can collect information about the client device 112. This can be because multiple APs 110 can hear a radio associated with the client device 112. Each of the APs 110 also can send the information to the signal strength engine 120 as well as an identifier that the information was taken from that particular AP 110. The signal strength engine 120 can provide the information to the client location engine 124.

The client location engine 124 thus has information that at a particular point in time, a number of APs 110 could hear the client device 112, the location of the APs 110, and the RSSIs of the signal that the APs heard from the client device 112. The client location engine 124 can determine the location of the client device 112 based on various approaches such as trilateration, triangulation, multilateration, etc.

In one example, the APs 110 are mapped to a plane or polygon. As such, with three distances and points of reference (APs 110), the intersection of circles using the distances can be used to determine coordinate information for the client device. In some examples, circles from two APs in conjunction with known or assumed boundaries (e.g., end of the polygon, a floor, etc.) can be used. In other examples, altitude can also be used and overlapping of spheres can be used to find a three dimensional coordinate to associate with the client device 112. Moreover, in some examples, if the intersection of distances from multiple APs 110 does not map exactly, averaging or other analysis can be used to estimate the location of the client device. For example, if 5 APs 110a, 110b, 110c, 110d, 110n hear the client device 112 and the view from one of the APs 110 is off from the others (e.g., due to interference limiting the hearing of the client device 112 from AP 110c), the correlation using information from AP 110c can be dropped for the analysis of client device 112. As such, the coordinate location of the client device 112 can be based on client RSSIs associated with the client device 112, the coordinate scale values, and coordinate information for the respective APs 110 that can hear the client device 112.

In some examples, a network controller 210 can interface between the APs 110 and location device 202. In one example, the APs 110 collect client and AP RSSI information and provide the RSSI information to the network controller 210. The network controller 210 can provide the information to the signal strength engine 120. In this manner, the APs 110 can indirectly provide the information to the signal strength engine 120 and the signal strength engine 120 can receive the RSSI information.

As used herein, the term network controller 210 can, for example, refer to any suitable entity that handles control and management functions of a network. It is appreciated that, certain networks may allow for the decoupling of traffic routing control decisions (e.g., which port of a given switch should be used to forward traffic en route to a given destination) from the network's physical infrastructure.

Network nodes within a network environment can forward traffic along a datapath based on metadata within the traffic. For example, traffic in the form of a packet can be received at a switch (or another suitable intermediary network node) such as an AP. For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes (e.g., client device 112), error detection codes, sequencing information, packet size of the packet, a time-to-live (TTL) value, etc. In contrast, payload data can include data carried on behalf of an application for use by source and destination nodes. In some examples, RSSI information can be provided from the APs 110 to signal strength engine 120 via the network controller 210 as control data. In other examples, the RSSI information can be provided using alternative approaches.

The engines 120, 122, 124, 226 include hardware and/or combinations of hardware and programming to perform functions provided herein. Moreover, modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 230, such as a central processing unit (CPU) or a microprocessor suitable for retrieval and execution of instructions and/or electronic circuits can be configured to perform the functionality of any of the engines described herein. In certain scenarios, instructions and/or other information, such as topology, classifications, rules, policies, location information, access point information, etc., can be included in memory 232 or other memory. Moreover, in certain implementations, some components can be utilized to implement functionality of other components described herein.

The communication networks can use wired communications, wireless communications, or combinations thereof. Further, the communication networks can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, devices can communicate with each other and other components with access to the respective networks via a communication protocol or multiple protocols. A protocol can be a set of rules that defines how nodes of the respective networks interact with other nodes. Further, communications between network nodes can be implemented by exchanging discrete packets of data or sending messages. Packets can include header information associated with a protocol (e.g., information on the location of the network node(s) to contact) as well as payload information. Networks can include the APs 110, the client device 112, the location device 202, the network controller 210, the internet, etc. One or more of the devices can communicate with other devices via one or more of the networks.

Figure 3:
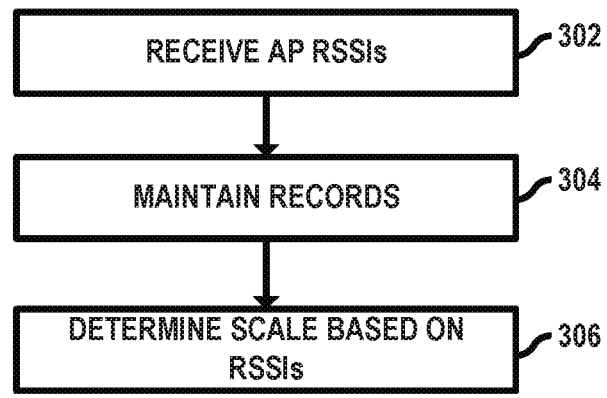
FIG. 3 is a flowchart of a method for determining a scale to use to track client locations using received signal strength indicators, according to an example.
Figure 4:
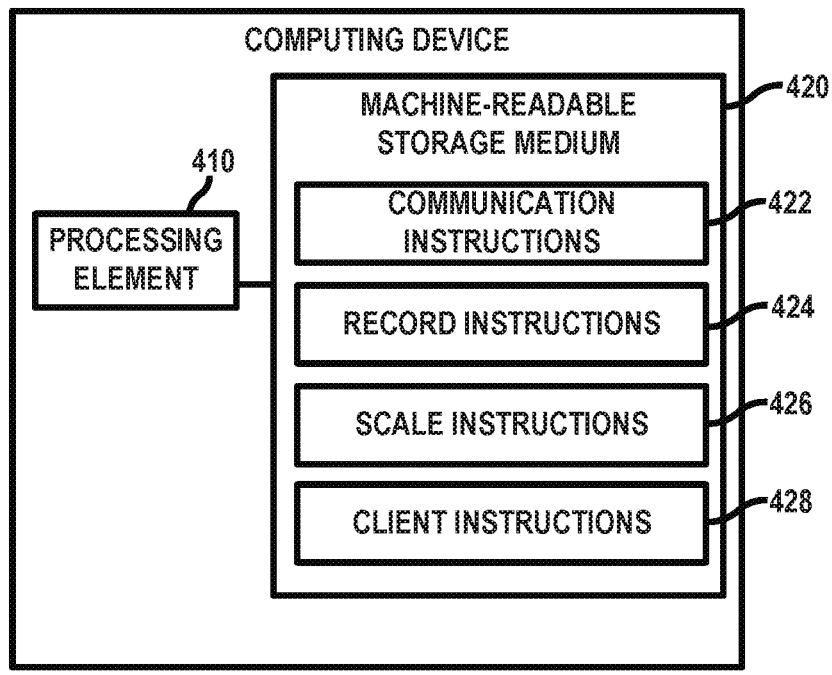
FIG. 4 is a block diagram of a computing device capable of determining client device coordinates based on received signal strength indicators, according to an example.

FIG. 3 is a flowchart of a method for determining a scale to use to track client locations using received signal strength indicators, according to an example. FIG. 4 is a block diagram of a computing device capable of determining client device coordinates based on received signal strength indicators, according to an example. The computing device 400 includes, for example, a processing element 410, and a machine-readable storage medium 420 including instructions 422, 424, 426, 428 for using RSSIs in a coordinate system. Computing device 400 may be, for example, a server, a workstation, a notebook computer, a slate computing device, or any other computing device capable of performing the functionality described.

As noted above, APs can be placed at various locations of a location (e.g., a building). An entity owning or controlling the locations may desire location information about client devices and their uses accessing the locations. As described above, APs can be provisioned coordinate information about themselves. In one example, this can be via a technician that sets up the AP. In another example, the APs can have a sensor, such as a GPS sensor to collect the information. Further, as noted above, APs can collect AP RSSIs about other access points in the location that the respective AP can hear. The APs can collect and send that information to a computing device 400. In some examples, an intermediary, such as a network controller can collect and/or process the RSSI information before it gets to the computing device 400. In some examples, RSSIs can be collected and sent as a group.

As noted, each of the APs can be associated with coordinate information. The coordinate information can be provided by the APs or be provided to the computing device 400 in another manner (e.g., based on user input). Further, in some examples, the computing device 400 may process raw coordinates to a coordinate system, for example, by mapping the APs to a polygon or plane.

At 302, the computing device 400 can execute communication instructions 422 to receive AP RSSIs. As noted, the RSSIs can be determined at the APs. As noted above, the AP RSSIs are from the perspective of one AP and referencing another one of the APs in the location.

At 304, record instructions 424 can be executed to maintain a plurality of records for the wireless AP reference pairs. The reference pairs can correspond to individual APs that supply the RSSIs and refer to the AP that the individual AP can hear.

At 306, the scale instructions 426 can be executed by processing element 410 to determine a scale associated with each of the records based on the RSSIs for the AP reference pairs and the coordinate information for the corresponding APs as described above, for example, in reference to Table 1 and Table 2.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, multiple cores across multiple devices (e.g., if the computing device 400 includes multiple node devices), or combinations thereof. Processing element 410 may fetch, decode, and execute instructions 422, 424, 426, 428 to implement location analysis. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for determining a scale to help determine client locations based on RSSIs.

Figure 5:
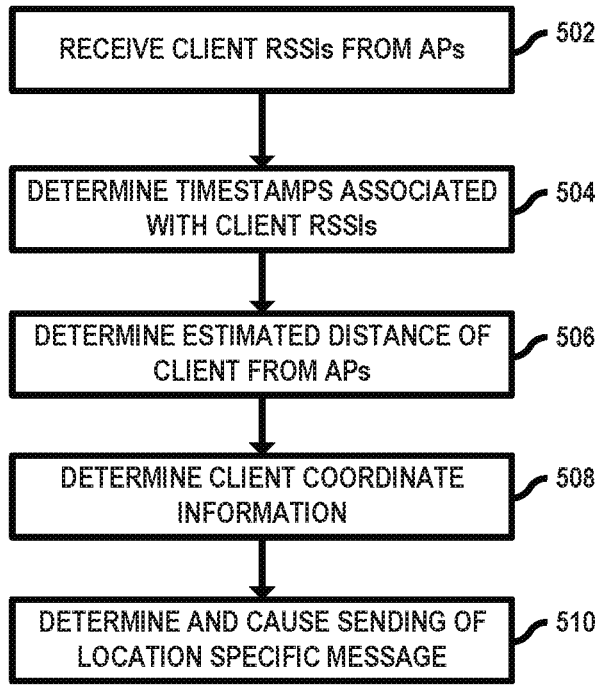
FIG. 5 is a flowchart of a method for determining client coordinate information based on received signal strength indicators, according to an example.

FIG. 5 is a flowchart of a method for determining client coordinate information based on received signal strength indicators, according to an example. Although execution of method 500 is described below with reference to computing device 400, other suitable components for execution of method 500 can be utilized (e.g., location device 202). Additionally, the components for executing the method 500 may be spread among multiple devices. Method 500 may be implemented in the form of executable instructions stored on a machine-readable storage medium, such as storage medium 420, and/or in the form of electronic circuitry.

As noted above, APs can hear clients as well as the other APs. The APs can determine client RSSIs when the client communicates with the respective APs. The client RSSIs can be associated with timestamps. The APs can send the client RSSI information to the computing device 400.

At 502, communication instructions 422 can be executed by processing element 410 to receive client RSSIs that are determined by the APs. As noted above, in some examples, client RSSIs for a client can be received from at least two APs while in other examples, client RSSIs for the client can be received from at least three APs.

At 504, the computing device 400 can determine the timestamps.

Timestamps can be used to determine what client RSSIs to use for determining a location of a client at a particular time. The timestamps can be used to coordinate information received from multiple APs. In certain examples, the APs can have their timing components synchronized.

At 506, client instructions 428 can be executed by the processing element 410 to determine estimated distances of the client from the APs that can hear the client. As described above, the estimated distances can be based on scales associated with AP reference pairs.

At 508, the client instructions 428 can be executed to determine client coordinate information for the client based on the estimated distances of the client from each of the APs. Since the coordinate information for the APs are known, analysis can be done based on the RSSI information, the scale, and the locations of the APs to determine the location of the client. In some examples, other information, such as boundary information can be used to help determine the coordinate information associated with the client. As noted above, timestamps can be used to determine when the client was at a particular location. For example, client location can be analyzed at multiple times, where RSSI information is used for particular time periods based on the timestamps to determine where the client is at various times.

At 510, the computing device 400 can determine a location specific message for the client. In one example, an advertisement associated with a store in a mall at the location may be provided based on the location of the client. In another example, a security warning may be provided when a client device reaches a certain point. In a further example, a message to get out particular paperwork at an airport may be provided when nearing a checkpoint. The computing device 400, or other computing device, can determine and send the location specific message to the client.

Information about some client devices can be used to send messages to other client devices as well. For example, employees at a store, theme park, or other location may be supplied with employee client devices. The locations of the employees can thus be tracked. Moreover, the computing device 400 can associate the employee devices as known devices belonging to employees. Further, other devices, such as customer devices can also be tracked. If a number of customer devices are at a particular location, an employee or multiple employees may receive a message to go to that location (e.g., to make sure that the customer needs are being met).

Figure 6:
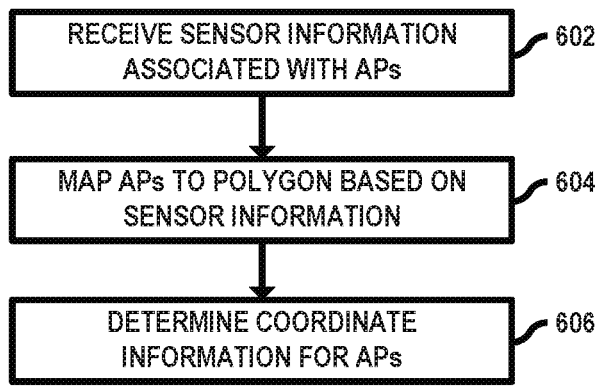
FIG. 6 is a flowchart of a method for determining coordinates for access points used for tracking client devices, according to an example.

FIG. 6 is a flowchart of a method for determining coordinates for access points used for tracking client devices, according to an example. Although execution of method 600 is described below with reference to AP location engine 226, other suitable components for execution of method 600 can be utilized (e.g., computing device 400). Additionally, the components for executing the method 600 may be spread among multiple devices. Method 600 may be implemented in the form of executable instructions stored on a machine-readable storage medium, such as storage medium 420, and/or in the form of electronic circuitry.

At 602, the AP location engine 226 can receive sensor information (e.g., GPS sensor information) associated with APs. In one example, the respective APs can collect the sensor information and send the information to the AP location engine 226. In some examples, the AP location engine 226 can receive coordinate information using alternative means, for example, the APs can be provisioned with the information and the APs can provide the coordinate information to the AP location engine 226. In another example, user input can be provided to the AP location engine 226 (e.g., as a field or table) to associate the APs with coordinate information.

At 604, the APs can be mapped to a polygon or plane. The mapping can be based on the sensor information, user input, etc. In a building, multiple floors can each be associated with a separate polygon. APs associated with particular floors can be used to analyze locations of clients heard by the APs located on that floor. At 606, coordinate information for the APs can be determined using the mapping. In one example, a reference AP can be used and coordinates can be marked from that reference AP. In another example, a global coordinate system can be used.

Figure 7:
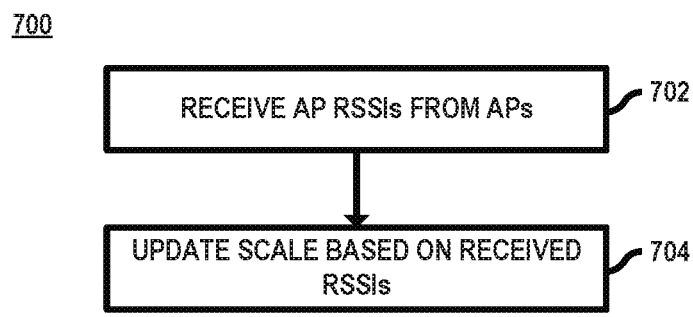
FIG. 7 is a flowchart of a method for updating a scale for received signal strength indicators to track client devices, according to an example.

FIG. 7 is a flowchart of a method for updating a scale for received signal strength indicators to track client devices, according to an example. Although execution of method 700 is described below with reference to computing device 400, other suitable components for execution of method 600 can be utilized (e.g., scale engine 122). Additionally, the components for executing the method 700 may be spread among multiple devices. Method 700 may be implemented in the form of executable instructions stored on a machine-readable storage medium, such as storage medium 420, and/or in the form of electronic circuitry.

As noted above, the AP RSSI information can be analyzed and updated to account for changes. The APs can continually or periodically collect and send AP RSSIs to the computing device 400. At 702, the computing device 400 can receive AP RSSIs from the APs. The computing device 400 can update the scale associated with one of the records that it maintains that corresponds to one of the AP reference pairs associated with the AP that provided the AP RSSI information (704).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
   receiving, by a computing device, a plurality of access point received signal strength indicators (RSSIs) determined at a plurality of wireless access points,
   wherein each of the wireless access points are associated with coordinate information,
   maintaining a plurality of records for wireless access point reference pairs,
   wherein each of the access point RSSIs are determined at a first one of the wireless access points and reference a second one of the wireless access points,
   wherein the wireless access point reference pairs correspond to the respective first one of the wireless access points and the second one of the wireless access points; and
   determining, by the computing device, a scale associated with each of the records based on the respective RSSIs for the respective wireless access point reference pairs and the coordinate information for the corresponding wireless access points in the wireless access point reference pairs.

2. The method of claim 1, further comprising:
   receiving a plurality of client RSSIs associated with a client from at least two of the wireless access points; and
   determining coordinate information for the client based on the respective scale associated with the at least two wireless access points.

3. The method of claim 2, further comprising:
   determining, by one of the at least two wireless access points, a first portion of the access point RSSIs and a second portion of the client RSSIs; and
   sending, by the one of the at least two wireless access points the first portion and the second portion to the computing device.

4. The method of claim 1, further comprising:
   receiving a plurality of client RSSIs associated with a client from at least three of the wireless access points;
   determining an estimated distance of the client from each of the at least three wireless access points based on at least one of the scales associated with the respective at least three wireless access point; and
   determining coordinate information for the client based on the respective estimated distances of the client from the at least three wireless access points.

5. The method of claim 1, further comprising:
   determining a location specific message for the client; and
   causing transmittal of the location specific message to the client.

6. The method of claim 1, further comprising:
   mapping the wireless access points to a plane based on sensor information, wherein the respective coordinate information is based on the sensor information and mapping.

7. The method of claim 1, further comprising:
   receiving, a different plurality of access point RSSIs from one of the wireless access points; and
   updating the scale associated with one of the records for a corresponding one of the wireless access point reference pairs.

8. A non-transitory machine-readable storage medium storing instructions that, if executed by a physical processing element of a computing device, cause the computing device to:
   receive, a plurality of access point (AP) received signal strength indicators (RSSIs) determined at a plurality of APs,
   wherein each of the APs are associated with coordinate information,
   maintain a plurality of records for AP reference pairs,
   wherein each of the AP RSSIs are determined at a first one of the APs and reference a second one of the APs,
   wherein the AP reference pairs correspond to the respective first one of the APs and the second one of the APs;
   determine a plurality of scales each scale associated with one of the records based on the respective RSSIs for the respective AP reference pairs and the coordinate information for the corresponding APs in the AP reference pairs;
   receive a plurality of client RSSIs associated with a client from at least two of the APs; and
   determine client coordinate information for the client based on the respective scale associated with the at least two APs.

9. The non-transitory machine-readable storage medium of claim 8, further comprising instructions that, if executed by the physical processing element, cause the computing device to:
   determine a plurality of timestamps associated with the respective client RSSIs,
   wherein the client coordinate information is further based on the timestamps.

10. The non-transitory machine-readable storage medium of claim 9, further comprising instructions that, if executed by the physical processing element, cause the computing device to:
    determine an estimated distance of the client from each of the at least two APs based on the respective scale associated with the at least two APs,
    wherein the client coordinate information is further based on the estimated distance.

11. The non-transitory machine-readable storage medium of claim 8, further comprising instructions that, if executed by the physical processing element, cause the computing device to:
    determine a location specific message for the client; and
    cause transmittal of the location specific message to the client.

12. The non-transitory machine-readable storage medium of claim 8, further comprising instructions that, if executed by the physical processing element, cause the computing device to:
    receive sensor information from the APs;
    map the APs to a polygon based on sensor information; and
    determine the respective coordinate information for the APs based on the sensor mapped sensor information.

13. A system comprising:
    a signal strength engine to receive a plurality of access point (AP) received signal strength indicators (RSSIs) from a first plurality of APs,
    wherein each of the first APs are associated with coordinate information including a first coordinate associated with a first dimension and a second coordinate associated with a second dimension,
    wherein a first one of the APs corresponds to a set of the AP RSSIs, wherein each of the AP RSSIs from the set relate to a respective signal strength associated with each of a second plurality of the APs;

a scale engine to determine a plurality of coordinate scale values according to the RSSIs from the set and the respective coordinate information of the first one AP and the second plurality of the APs;

a client location engine to:

receive a plurality of client RSSIs associated with a client device from the first one AP and the second plurality of the APs;

determine a coordinate location of the client device based on the client RSSIs, the coordinate scale values, and the coordinate information of the first one AP.

14. The system of claim 13, further comprising:

the first one AP to:

collect a group of the AP RSSIs associated with the second plurality of the APs; and send the group of the RSSIs to the signal strength engine.

15. The system of claim 14, wherein the first one AP further includes a location sensor that determines the coordinate information associated with the first one AP.

* * * * *